(12) United States Patent
Bjäre et al.

(10) Patent No.: US 7,958,496 B2
(45) Date of Patent: Jun. 7, 2011

(54) METHOD OF AND SYSTEM FOR APPLICATION SERVICE EXCHANGE ACROSS DIFFERENT EXECUTION ENVIRONMENTS

(75) Inventors: Björn Bjäre, Lund (SE); Jonas Hansson, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 662 days.

(21) Appl. No.: 10/893,808

(22) Filed: Jul. 19, 2004

(65) Prior Publication Data

US 2005/0138116 A1 Jun. 23, 2005

Related U.S. Application Data

(60) Provisional application No. 60/532,235, filed on Dec. 22, 2003.

(51) Int. Cl.
*G06F 9/44* (2006.01)
*G06F 15/16* (2006.01)

(52) U.S. Cl. ......... 717/127; 717/124; 709/201

(58) Field of Classification Search ......... 707/203; 709/203, 127; 717/120–127
See application file for complete search history.

(56) References Cited

U.S. PATENT DOCUMENTS

| | | | |
|---|---|---|---|
| 6,868,448 B1 * | 3/2005 | Gupta et al. | 709/226 |
| 6,868,451 B1 * | 3/2005 | Peacock | 709/231 |
| 6,986,148 B2 * | 1/2006 | Johnson et al. | 719/332 |
| 7,003,482 B1 * | 2/2006 | Margoscin et al. | 705/35 |
| 7,032,002 B1 * | 4/2006 | Rezvani et al. | 709/203 |
| 7,035,944 B2 * | 4/2006 | Fletcher et al. | 709/250 |
| 7,114,148 B2 * | 9/2006 | Irving et al. | 717/121 |
| 7,191,216 B2 * | 3/2007 | Mattila et al. | 709/205 |
| 7,191,250 B1 * | 3/2007 | Oueslati et al. | 709/245 |
| 7,536,181 B2 * | 5/2009 | Solve et al. | 455/419 |
| 7,584,471 B2 * | 9/2009 | Bjare et al. | 717/178 |
| 2001/0039565 A1 * | 11/2001 | Gupta | 709/203 |
| 2003/0005034 A1 * | 1/2003 | Amin | 709/202 |
| 2003/0041124 A1 * | 2/2003 | Navarre et al. | 709/219 |
| 2003/0055878 A1 * | 3/2003 | Fletcher et al. | 709/203 |
| 2003/0084056 A1 * | 5/2003 | DeAnna et al. | 707/100 |
| 2003/0139174 A1 * | 7/2003 | Rao | 455/418 |
| 2003/0224769 A1 * | 12/2003 | Solve et al. | 455/418 |
| 2003/0233465 A1 * | 12/2003 | Le et al. | 709/231 |
| 2004/0049589 A1 * | 3/2004 | Papanikolaou et al. | 709/229 |
| 2004/0098727 A1 * | 5/2004 | Bjare et al. | 719/310 |

(Continued)

FOREIGN PATENT DOCUMENTS

EP 1 111 505 A 6/2001

(Continued)

OTHER PUBLICATIONS

Bellifemine et al., "Developing Multi-agent Systems with JADE", 2001, Springer, retrieved from <http://www.imamu.edu.sa/dcontent/IT_Topics/java/bellifemine01.pdf>, pp. 89-103.*

(Continued)

*Primary Examiner* — Thuy Dao
*Assistant Examiner* — Marina Lee

(57) ABSTRACT

A method of application service exchange across different execution environments includes receiving a registration to handle a service from a server application operating in a first execution environment, receiving a request for the service from a client application operating in a second execution environment, requesting the service from the server application, receiving a result from the server application responsive to the requesting step, and delivering the result to the client application.

19 Claims, 2 Drawing Sheets

U.S. PATENT DOCUMENTS

| | | | |
|---|---|---|---|
| 2004/0098733 A1* | 5/2004 | Bjare et al. ............... | 719/328 |
| 2004/0128347 A1* | 7/2004 | Mason et al. ............... | 709/203 |
| 2004/0215711 A1* | 10/2004 | Martin et al. ............... | 709/203 |
| 2005/0050173 A1* | 3/2005 | Kikuchi ............... | 709/219 |
| 2005/0138116 A1* | 6/2005 | Bjare et al. ............... | 709/203 |

FOREIGN PATENT DOCUMENTS

| | | |
|---|---|---|
| JP | 2001-034616 A | 2/2001 |
| WO | WO 99/16227 A | 4/1999 |

OTHER PUBLICATIONS

Chan et al. "MobiPADS: A Reflective Middleware for Context-Aware Mobile Computing", Dec. 2003,IEEE Transactions on Software Engineering, vol. 29, No. 12, pp. 1072-1085.*

Object Management Group: "Common Object Request Broker Architecture: Core Specification—Version 3.0—Chapters 1, 2 and 13" 'Online! Dec. 6, 2002, XP002347286 Retrieved from the Internet: URL: http://www.omg.org/cgi-bin/apps/doc?formal/02-12-06.pdf> retrieved on Sep. 28, 2005! pp. 2-1-pp. 2-18.

* cited by examiner

METHOD OF AND SYSTEM FOR APPLICATION SERVICE EXCHANGE ACROSS DIFFERENT EXECUTION ENVIRONMENTS

CROSS-REFERENCE TO RELATED APPLICATIONS

This patent application claims priority from, and incorporates by reference the entire disclosure of, U.S. Provisional Application No. 60/532,235, filed on Dec. 22, 2003.

BACKGROUND OF THE INVENTION

1. Technical Field

The present invention relates generally to communication between applications in different execution environments and, more particularly, to application service exchange across different execution environments.

2. History of Related Art

In many embedded systems, all applications execute in the same native execution environment. The execution environment defines the possibilities and constraints for applications in terms of how services are accessed and used, how events are received, how shared resources such as memory are used, how operating systems work and are used, how parallelity in execution in the system is achieved, and how the application is controlled in terms of start and stop. In other words, the execution environment defines the possibilities and constraints for execution and installation of the application. Use of the same execution environment for all applications implies that the rules for all applications are the same throughout the system and that execution-environment specifications are controlled from a single organization.

However, in mobile devices, additional execution environments (e.g., the non-native execution environment JAVA) are being introduced that exist in parallel with the mobile device's native execution environment. In addition, many mobile-device platform customers have proprietary execution environments that are ported onto a mobile-device platform in order to preserve the customers' investments in legacy applications.

Standardized execution environments, such as JAVA, may impose requirements on other execution environments that coexist with standardized execution environments via, for example, the JAVA Specification Request (JSR) specifications. For instance, JSR 75 states that when an end user of a JAVA application edits a phone number, an existing phonebook on the system is to be invoked in order to be able to select the desired contact and then copy the phone number back to an edit field in the JAVA application. Thus, the JAVA execution environment puts requirements on an arbitrary application, which might execute in the native execution environment or in another commercial/proprietary execution environment. Since the specific design of such applications are not under the control of, for example, platform manufacturers, these requirements call for techniques that allow applications in different execution environments to exchange services across execution-environment boundaries.

SUMMARY OF THE INVENTION

A method of application service exchange across different execution environments includes receiving a registration to handle a service from a server application operating in a first execution environment, receiving a request for the service from a client application operating in a second execution environment, requesting the service from the server application, receiving a result from the server application responsive to the requesting step, and delivering the result to the client application.

A system for application service exchange across different execution environments includes a first execution environment, a server application adapted to execute on the first execution environment, a second execution environment, a client application adapted to execute on the second execution environment, and a platform service management support. The platform service management support is adapted to receive a request for the service by the client application, request the service from the server application, and deliver a result responsive to the request to the client application.

BRIEF DESCRIPTION OF THE DRAWINGS

A more complete understanding of the present invention may be obtained by reference to the following Detailed Description of Exemplary Embodiments of the Invention, when taken in conjunction with the accompanying Drawings, wherein.

DETAILED DESCRIPTION OF EXEMPLARY EMBODIMENTS OF THE INVENTION

Figure 1:
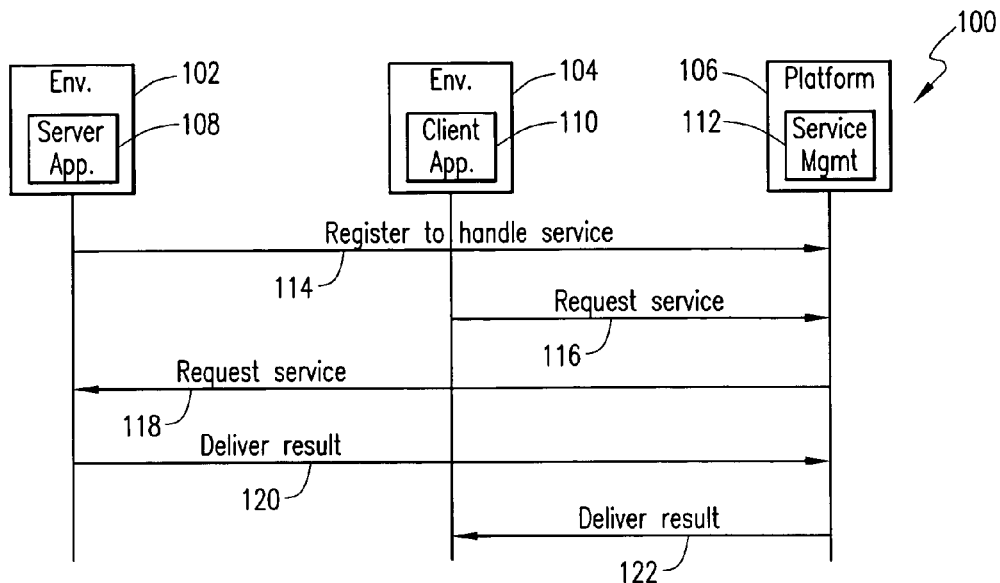
FIG. 1 is a messaging diagram illustrating a client request and server fulfillment of the request when the server is already running at the time of the client request.

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

In accordance with principles of the invention, information is exchanged between a client and a server at a service level using a platform service management support. For example, a server registers itself as being able to handle a particular service or set of services, such as, for example, "SupplyPhoneNumber" in the example discussed above. If a client in any execution environment requests the phone number and there exists a server registration, a request is forwarded via mobile-device platform service management support to the server that is registered for handling the service. When the server has carried out the service, the result is forwarded via the platform service management support to the client.

By defining a connection between client and server applications in completely different execution environments on the service level instead of on their respective execution-environment-specific levels, a generic mechanism for exchanging information across execution-environment boundaries may be defined. The endpoints (i.e., the client and the server) need not know of each other and are compile-time and link-time independent of one another. The endpoints need only have knowledge of and be adapted towards the platform service management support. Thus, the platform service management support may act as a service router. From a server perspective, the platform simply publishes a set of requested services. From a client perspective, the platform publishes a set of potentially-accessible services. The client may specify the service and the server may decide whether it is able to handle a request for such a service. If so, the server registers itself as being able to handle the service.

The client (e.g., in an example represented by the JAVA standardization) specifies the service and the server decides whether the server is able to handle such a request. The client-specified solution is somewhat opposite of most client-server designs, in which the client checks to determine if the specification of a service by a specific server fulfills the needs of the client. A method in accordance with various embodiments of the invention addresses both cases. Two exemplary cases regarding how the service and its functional interface are specified and represented are as follows:

(1) A service is specified in a way that is not tied to a specific execution environment or a specific representation of the service. However, the end points (i.e., client and the server) must adapt to the platform service management support. From an implementation perspective, one way of accomplishing a non-specific service representation is to use strings which, except for a character-coding scheme, are service-representation and execution-environment neutral. In this case, concepts such as, for example, "phone number" and "address" represent data semantics that are universal on all systems.

(2) A service is specified in a way that is tied to the platform service management support representation of the service. In other words, the end points (i.e., the client and the server) must adapt to the platform service management support and know how the service is represented by the mutually-known platform service management support.

The platform service management support includes two parts: (a) a service registration part that keeps track of which server implements which services; and (b) a service broker part that acts as a connection point for the client and the server. The service request is forwarded from the client to the server and the service result is forwarded from the server to the client by the platform service management support.

Three exemplary cases regarding where the platform service management support is located and implemented in a system are described below. The choice of where the platform service management support is located need not affect how the client or the server uses the platform service management support. Three exemplary platform-service-management-support locations are as follows:

(1) The platform service management support is integrated into the platform.
(2) The platform service management support is implemented in a plug-in.
Plug-ins are discussed in more detail in U.S. patent application Ser. No. 10/665,834, which application is entitled The Plug-In Model and is incorporated by reference.
(3) The registration part of the platform service management support is integrated into the platform while the service broker part of the platform service management support is implemented in a plug-in.

Each of the three platform-service-management-support location cases listed above offers different pros and cons relative to external visibility, integration, process and company-strategic decisions. For example, if the platform service management support is located according to case 2 or case 3 above, development of, for example, JAVA JSRs, which requires native services, does not have to be synchronized with overall platform development.

Figure 3:
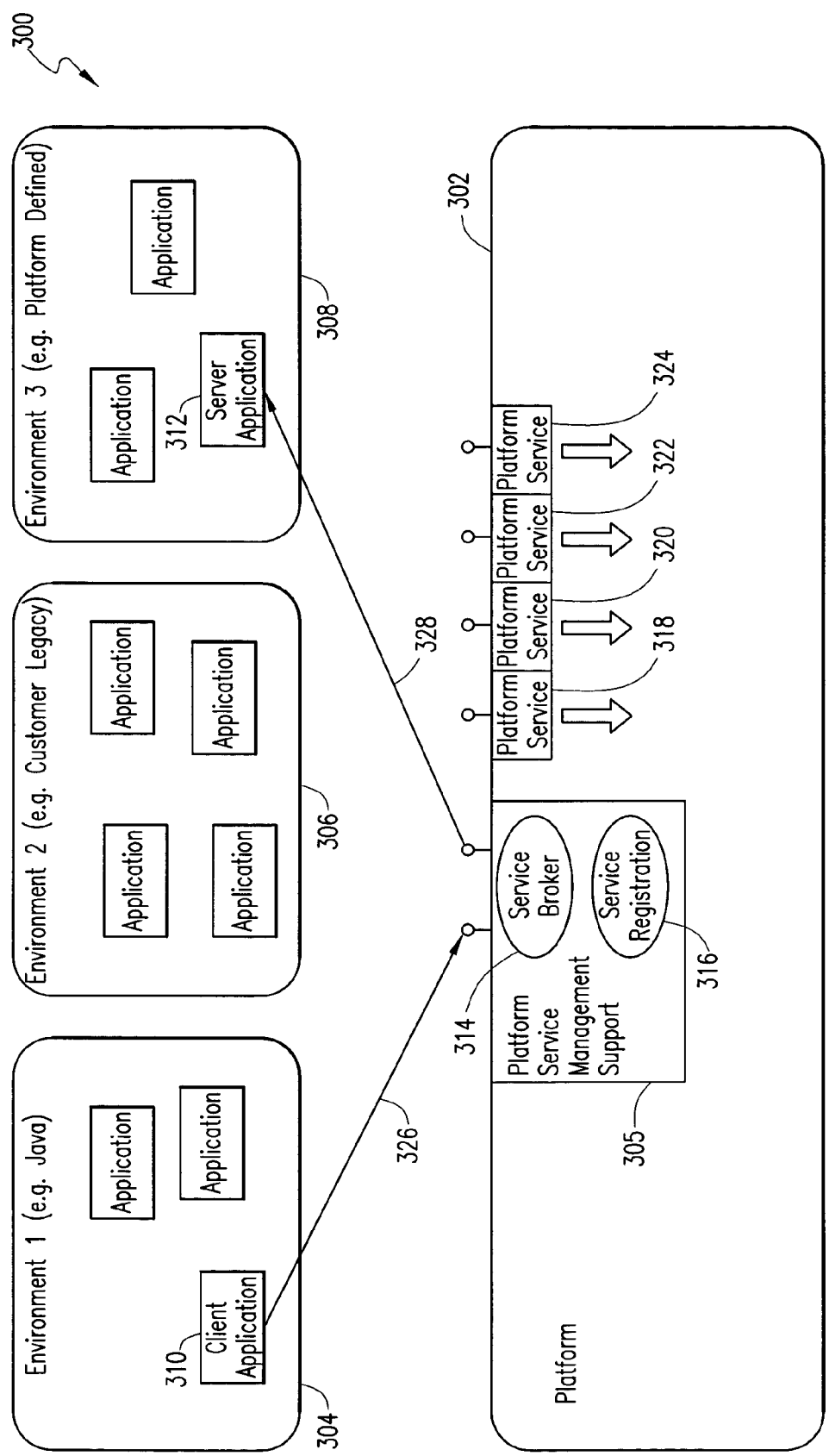
FIG. 3 is a logical block diagram overview of an application service exchange across different execution environments in accordance with embodiments of the invention.

Referring now to the FIGURES, FIG. 3 is a logical block diagram overview of an application service exchange across different execution environments in accordance with embodiments of the invention. Although FIG. 3 illustrates platform service management support located in a platform, it will be understood by those having ordinary skill in the art that the platform service management support may be located in accordance with any of the three cases discussed above without departing from principles of the invention. FIG. 3 illustrates a system 300 that includes a platform 302. Platforms such as the platform 302 are discussed in further detail in U.S. patent application Ser. No. 10/359,835, which application is entitled Platform System for Mobile Terminals and is incorporated by reference.

The platform 302 includes a platform service management support 305. Also shown as part of the system 300 are an execution environment 304, an execution environment 306, and an execution environment 308. As an example, the execution environment 304 could be a JAVA execution environment, the execution environment 306 could be a customer legacy execution environment, and the execution environment 308 could be a platform-defined execution environment.

Shown within the execution environment 304 is a client application 310. A server application 312 is shown within the execution environment 308. Various other applications are also illustrated within each of the execution environments 304, 306, and 308. The platform service management support 305 includes a service broker part 314 and a service registration part 316. Also shown as part of the platform 302 are a plurality of platform services 318, 320, 322, and 324. Arrows 326 and 328 generally illustrate communication between the client application 310 and the server application 312 via the platform service management support 305, the arrows 326 and 328 indicating a service request being forwarded by the client application 310 to the platform service management support 305 and the service request being forwarded by the platform service management support 305 to the server application 312.

FIG. 1 is a messaging diagram illustrating a client request and server fulfillment of a request when the server is already running at the time of the client request. A mobile device 100 includes an execution environment 102, an execution environment 104, and a platform 106. The execution environment 102 includes a server application 108. The execution environment 104 includes a client application 110. The platform 106 includes a platform service management support 112.

At a message 114, the server application 108 uses the platform service management support 112 of the platform 106 in order to register as a handler for a given service. The platform service management support 112 stores this information. The service is specified in a semantically generic way. At a message 116, the client application 110 uses the platform service management support 112 of the platform 106 to request the service. The client application 110 does not know which server application or execution environment implements the service; however, the identity of the server application that implements the requested service is known by the platform service management support 112. The platform service management support 112 knows which server application implements the service and, at a message 118, transfers the service request to the appropriate server application (i.e., the server application 108).

At a message 120, the server application 108 carries out the service and delivers a result of the service to the platform service management support 112. The platform service management support 112 knows that the client application 110 requested the service and delivers the result of the service at a message 122 to the client application 110.

Figure 2:
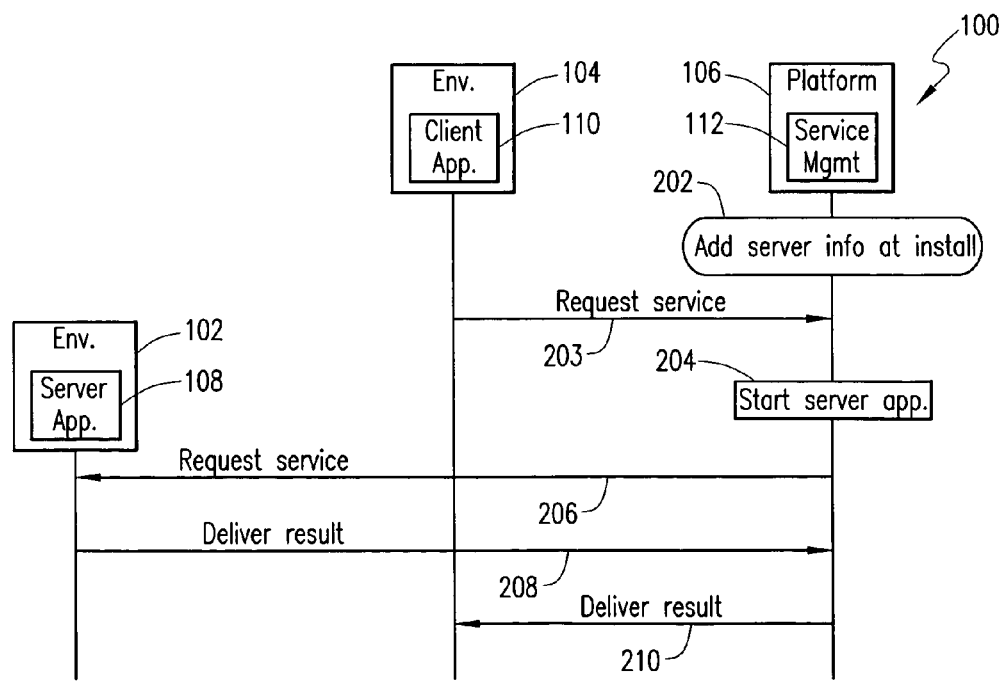
FIG. 2 is a messaging diagram illustrating a client request and server fulfillment of the request when the server is not running at the time of the client request.

Referring again to the FIGURES, FIG. 2 is a messaging diagram illustrating a client request and server fulfillment of the client request when the server is not running at the time of the client request. At step 202, the server application 108 supplies the information needed for service registration in the platform service management support 112 upon installation of the server application 108. The platform service management support 112 stores this information.

At a message 203, the client application 110 uses the platform service management support 112 of the platform 106 to request the service. The client application 110 does not know which server application or execution environment implements the service; however, the identity of the server application that implements the requested service is known by the platform service management support 112. The platform service management support 112 keeps track of which server application implements the service (i.e., the server application 108). If, as in FIG. 2, the server application 108 has not yet been started, the platform service management support 112 starts the server application at step 204. At a message 206, the platform service management support 112 transfers the service request to the server application 108. The server application 108 carries out the service and delivers a result of the service to the platform service management support 112 at a message 208. The platform service management support 112 knows which client application requested the service (i.e., the client application 110) and delivers the result of the service to the client application 110 at a message 210.

If it is not desired that the platform service management support 112 automatically start the server application 108 as shown in FIG. 2 because, for example, of specific ways of starting applications used by an execution environment, but it is still desired that the server application 108 start on demand when the client application 110 requests services of the server application 108, a broker application may be used in the execution environment 102 of the server application 108. The broker application would know the services of various server applications on the same execution environment (e.g., the execution environment 102) and would be able to start the server applications on demand in response to a request from, for example, the platform service management support 112.

Various embodiments of the invention serve to permit fundamentally different execution environments to be interconnected, bypass implementation differences, and offer a dynamic way for an embedded mobile-device platform to open up a specification of required services that can be met by any application server. In addition, various embodiments of the invention may be used in a generic way for communications between applications in arbitrary execution environments. Implementation differences between different execution environments may be bridged in terms of information exchange. In addition, a set of services required by a client may be specified, as opposed to specifying a set of services offered by a server. The information exchange between the execution environments may take place using, for example, characters/strings to avoid representation dependencies. In addition, the server and the client need not be aware of each other. A generic service request channel can be established between two endpoints in different execution environments. Moreover, various embodiments of the invention support both server-driven and client-driven service specification.

The previous Detailed Description is of embodiment(s) of the invention. The scope of the invention should not necessarily be limited by this Description. The scope of the invention is instead defined by the following claims and the equivalents thereof.

What is claimed is:

1. A method of application service exchange across different execution environments wherein an execution environment refers to the rules and constraints for execution and installation of an application, the method comprising the steps of:
   implementing a platform service management support on an embedded mobile-device platform on a mobile device;
   receiving a registration to handle a service by the platform service management support from a server application operating in a first execution environment on the mobile device, wherein the step of receiving the registration is performed by a registration part of the platform service management support;
   receiving a request for the service by the platform service management support from a client application operating in a second execution environment on the mobile device;
   requesting the service by the platform service management support from the server application;
   receiving a result by the platform service management support from the server application responsive to the requesting step; and
   delivering the result by the platform service management support to the client application, wherein the service is specified in an execution environment neutral manner;
   wherein the steps of receiving the request for the service, requesting the service, receiving the result, and delivering the result are performed by a service broker part of the platform service management support.

2. The method of claim 1, wherein the client application is not aware of the location of the server application or the first execution environment.

3. The method of claim 2, wherein the server application is not aware of the location of the client application or the second execution environment.

4. The method of claim 1, wherein the service is represented using a string of characters.

5. The method of claim 1, wherein the service is represented in terms of a platform-service-management-support-specific representation.

6. The method of claim 1, wherein the platform service management support is implemented in a plug-in of the mobile device.

7. The method of claim 1, wherein the platform service management support further comprises:
   a registration part implemented as part of a platform of the mobile device; and
   a service broker part implemented in a plug-in of the mobile device.

8. The method of claim 1, further comprising:
   the client application specifying at least one service; and
   the server application determining whether the server application is capable of handling the service specified by the client application.

9. The method of claim 1, further comprising:
   the server application specifying at least one service; and
   the client application determining whether the at least one service specified by the server application is in accordance with the client-application service request.

10. A system for application service exchange across different execution environments, wherein an execution environment refers to the rules and constraints for execution and installation of an application, implemented using program code loadable into at least one memory and executable by at least one computer processor, the system comprising:
    a mobile terminal having an embedded mobile-device platform including a platform service management support wherein the platform service management support further comprises a registration part and a service broker part;

the mobile terminal receiving a registration to handle a service by the platform service management support from a server application operating in a first execution environment on the mobile terminal, wherein the receiving the registration is performed by the registration part of the platform service management support;

wherein the platform service management support is adapted to:

receive a request for the service from the client application operating in a second execution environment on the mobile terminal;

request the service from the server application;

receive a result from the server application responsive to the request of the service from the server application; and deliver a result responsive to the request to the client application wherein the service is specified in an execution-environment-neutral manner, wherein the receiving the request, the requesting the service, and the delivering the result are performed by the service broker part of the platform service management support.

11. The system of claim 10, wherein the platform service management support is further adapted to:

receive a registration to handle the service by the server application; and receive the result from the server application responsive to the requesting step.

12. The system of claim 10, wherein the platform service management support is implemented in a plug-in.

13. The system of claim 10; wherein the platform service management support comprises:

a registration part implemented as part of a platform; and a service broker part implemented in a plug-in.

14. The system of claim 10, wherein the client application is not aware of the location of the server application or the first execution environment.

15. The system of claim 14, wherein the server application is not aware of the location of the client application or the second execution environment.

16. The system of claim 10, wherein the service is represented using a string of characters.

17. The system of claim 10, wherein the service is represented in terms of a platform-service-management-support-specific representation.

18. The system of claim 10, wherein the client application is adapted to specify at least one service and the server application is adapted to determine whether the server application is capable of handling the service specified by the client application.

19. The system of claim 10, wherein the service application is adapted to specify at least one service and the client application is adapted to determine whether the at least one service specified by the server application is in accordance with the client-application service request.

* * * * *

UNITED STATES PATENT AND TRADEMARK OFFICE
CERTIFICATE OF CORRECTION

| | |
|---|---|
| PATENT NO. | : 7,958,496 B2 |
| APPLICATION NO. | : 10/893808 |
| DATED | : June 7, 2011 |
| INVENTOR(S) | : Bjäre et al. |

It is certified that error appears in the above-identified patent and that said Letters Patent is hereby corrected as shown below:

In Column 3, Line 51, delete "The" and insert -- the --, therefor.

In Column 8, Line 5, in Claim 13, delete "10;" and insert -- 10, --, therefor.

Signed and Sealed this
Eighth Day of November, 2011

David J. Kappos
*Director of the United States Patent and Trademark Office*